UNITED STATES PATENT OFFICE.

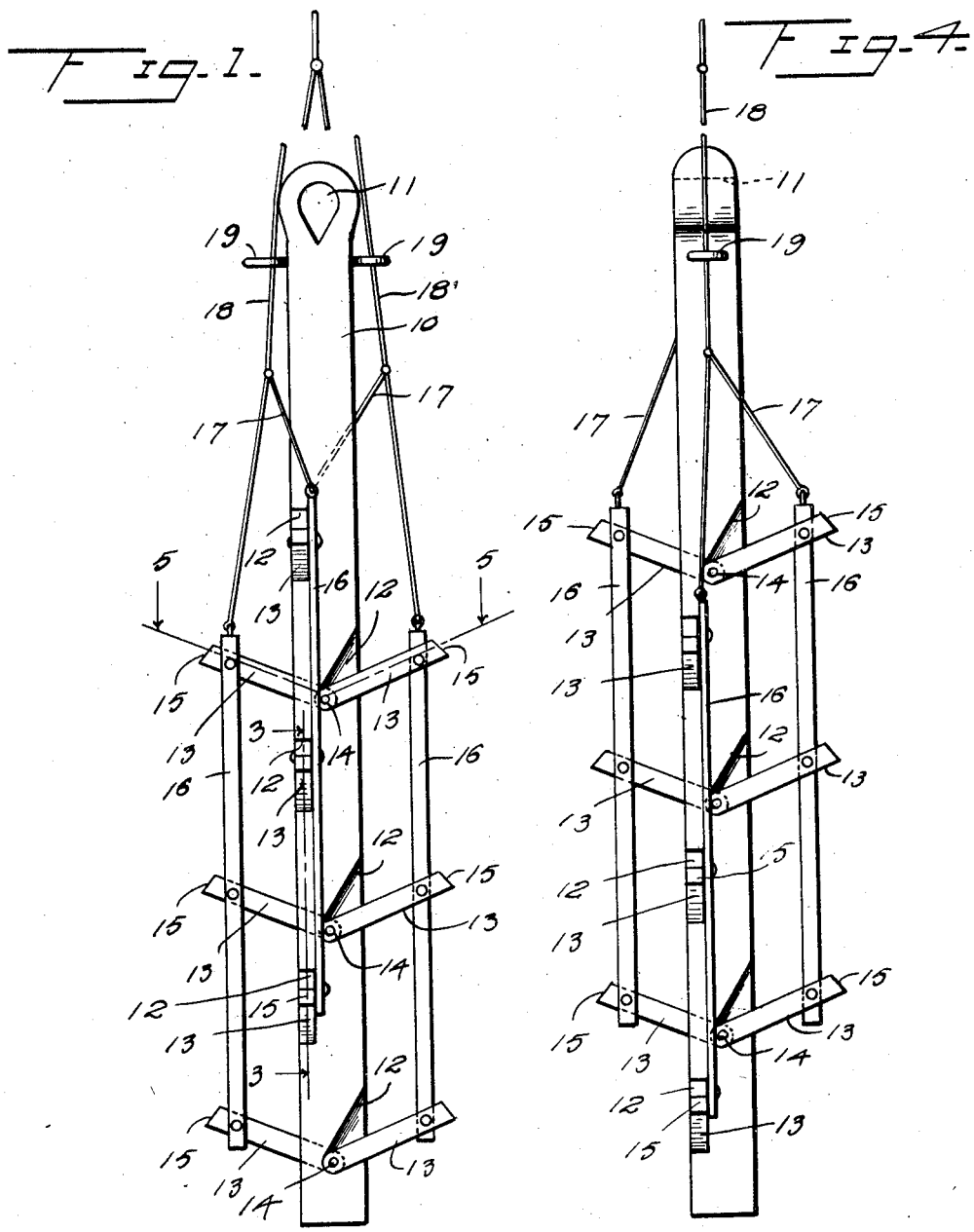

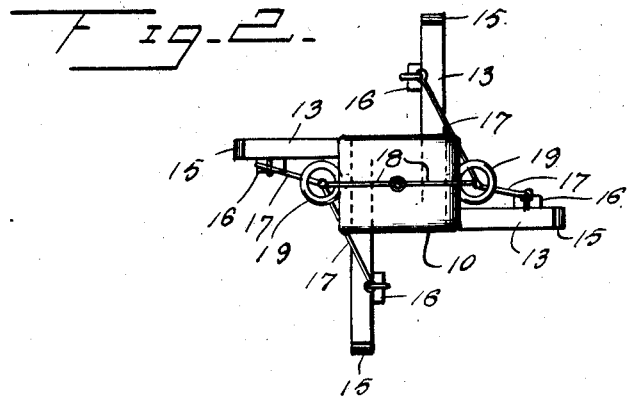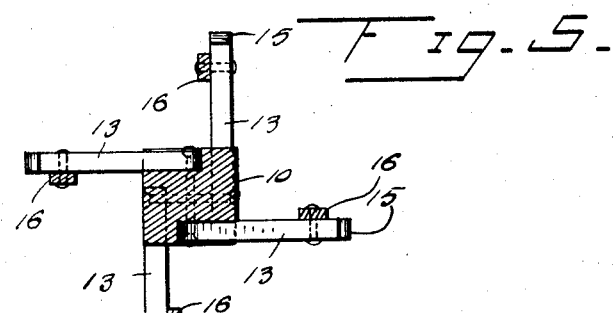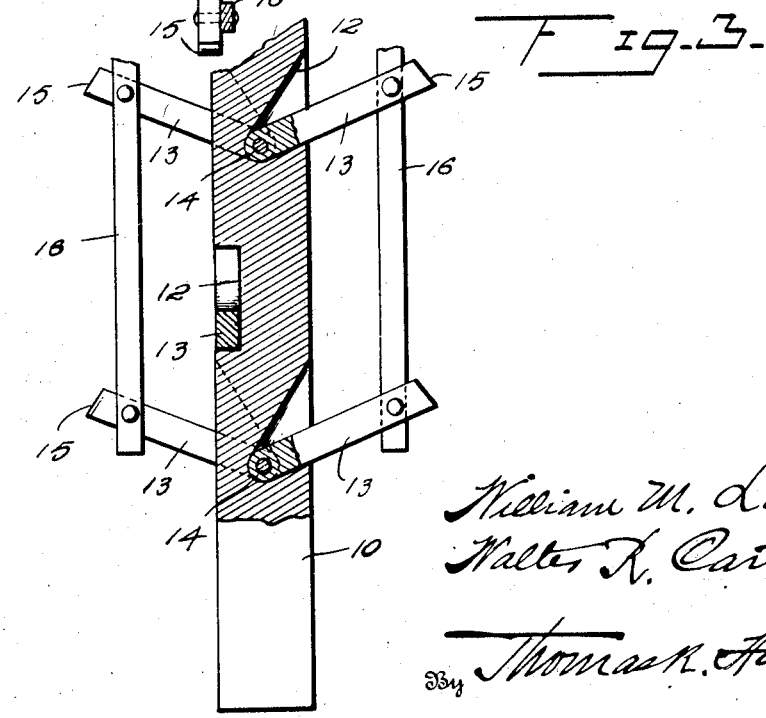

WILLIAM M. LAND AND WALTER R. CARTER, OF RIVERSIDE, CALIFORNIA.

GRAPPLE.

1,357,099.  Specification of Letters Patent.  Patented Oct. 26, 1920.

Application filed January 19, 1920. Serial No. 352,419.

*To all whom it may concern:*

Be it known that we, WILLIAM M. LAND and WALTER R. CARTER, citizens of the United States of America, residing at Riverside, in the county of Riverside and State of California, have invented certain new and useful Improvements in Grapples, of which the following is a specification.

Our present invention relates generally to grapples, and more particularly to grapples for hollow articles, our object being the provision of a device which may be utilized for drawing pipes or casings from the ground, as well as one adapted for general use in connection with derricks, cranes and the like for lifting and transporting hollow articles.

More particularly our invention relates to a device whereby to secure a readily releasable grip internally of a hollow article and embodies a beam or shaft to which are pivotally connected a plurality of spreaders in the nature of grippers, capable of swinging outwardly and downwardly with respect to the beam or shaft to secure their grip, and so connected and related to the beam or shaft as to relieve the pivotal connections of all strain when the spreaders or grippers are in engaged relation with the work.

In the accompanying drawing which illustrates our invention and forms a part of this specification,—

Figure 1 is an elevation of our improved gripping device or grapple,

Fig. 2 is a top plan view thereof, and

Fig. 3 is a partial vertical longitudinal section taken on line 3—3 of Fig. 1.

Fig. 4 is an elevation of the device at right angles to its position in Fig. 1.

Fig. 5 is a horizontal section on line 5—5 of Fig. 1.

Referring now to these figures our invention proposes a beam or shaft 10, preferably provided at its upper end with an eye 11 in order to facilitate its connection with a rope or cable or the like, and having in its length a plurality of lengthwise spaced recesses 12, each of which extends into one face of the beam or shaft and is of generally the triangular form shown.

In each of the recesses is pivoted the inner end of a spreader or gripping arm 13, the pivotal connection of which is indicated at 14, and the inner rounded end of which snugly interfits the inner rounded portion of its respective recess 12. The lower portion of each recess terminates at an inclined shoulder of the beam or shaft upon which the respective spreader or gripping arm 13 is adapted to rest in its lower active or engaged position so that when so positioned, the fact that the respective arm rests on the shoulder and interfits the inner end of the recess, results in relieving the pivot 14 from all strain.

The several recesses 12 and their arms 13 are arranged in the several faces of the beam or shaft in longitudinal series, and the spreaders or gripping arms 13 of each series are pivotally connected adjacent to their outer beveled engaging ends 15, by means of connecting rods 16, to the upper ends of the latter of which releasing connections 17 are secured. These releasing connections 17 lead from a releasing wire or rope 18, the latter of which passes through a guide 19 upon the upper portion of the beam or shaft 10 so that it is thus obvious that upon the release of upward or lifting movement of the beam or shaft, the several spreaders or gripping arms may be simultaneously drawn upwardly and inwardly toward released position.

As before stated the several spreaders or gripping arms move against the shoulders at the lower portions of the recesses in engaged position at which time their outer beveled ends securely grip the inner surface of the article to be lifted, and inasmuch as the inner end of these arms snugly interfit the inner portions of the recesses, it is obvious that the strain of lifting the article in operation will be borne by the several gripping arms in their stated positions, and entirely relieved from the inner pivots 14 of the arms.

Our invention thus provides a readily operable device of this nature, which is simple in construction, which will be lasting and durable in use and which is readily adaptable to various uses including the pulling of wheel casings, pipes and the like from the ground as well as for the lifting and transportation of hollow articles in connection with derricks, cranes and similar structures.

We claim:

An internal gripping device comprising a beam or shaft provided with lengthwise series of recesses at spaced points therearound, series of gripping arms pivoted to their inner ends to move in the recesses and having outer gripping ends, connecting rods pivotally connecting the gripping arms of each series adjacent to their outer ends, and a releasing member movably associated with the beam or shaft and having movable connection with the said connecting rods at one end for the purpose described.

In testimony whereof we affix our signatures.

WILLIAM M. LAND.
WALTER R. CARTER.